(12) United States Patent
Mutoh et al.

(10) Patent No.: US 10,087,093 B2
(45) Date of Patent: Oct. 2, 2018

(54) FLUID TREATMENT APPARATUS

(71) Applicants: Toshiyuki Mutoh, Kanagawa (JP); Shogo Suzuki, Kanagawa (JP); Yuu Zama, Kanagawa (JP); Aya Utsuki, Kanagawa (JP); Kimio Aoki, Kanagawa (JP); Hideyuki Miyazawa, Kanagawa (JP); Makito Nakashima, Kanagawa (JP); Kenichi Hayakawa, Kanagawa (JP); Shigeru Yamada, Kanagawa (JP)

(72) Inventors: Toshiyuki Mutoh, Kanagawa (JP); Shogo Suzuki, Kanagawa (JP); Yuu Zama, Kanagawa (JP); Aya Utsuki, Kanagawa (JP); Kimio Aoki, Kanagawa (JP); Hideyuki Miyazawa, Kanagawa (JP); Makito Nakashima, Kanagawa (JP); Kenichi Hayakawa, Kanagawa (JP); Shigeru Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 398 days.

(21) Appl. No.: 14/730,498

(22) Filed: Jun. 4, 2015

(65) Prior Publication Data

US 2015/0376042 A1    Dec. 31, 2015

(30) Foreign Application Priority Data

Jun. 30, 2014    (JP) ................. 2014-134329

(51) Int. Cl.
*B01J 19/00* (2006.01)
*B01J 19/26* (2006.01)
(Continued)

(52) U.S. Cl.
CPC ............. *C02F 1/725* (2013.01); *B01J 19/006* (2013.01); *B01J 19/26* (2013.01); *C02F 11/06* (2013.01);
(Continued)

(58) Field of Classification Search
CPC .. C02F 1/02; C02F 1/025; C02F 1/444; C02F 1/725; C02F 2101/30; C02F 2101/366;
(Continued)

(56) References Cited

U.S. PATENT DOCUMENTS 5,395,522 A * 3/1995 Melanson ............... C02F 1/325
                                                                204/157.15
2013/0134106 A1    5/2013 Suzuki et al.
(Continued)

FOREIGN PATENT DOCUMENTS

JP    H08-500291 A    1/1996
JP    2002-186843    7/2002
(Continued)

OTHER PUBLICATIONS

U.S. Appl. No. 14/729,176, filed Jun. 3, 2015, Zama, et al.
(Continued)

Primary Examiner — Lucas Stelling
(74) Attorney, Agent, or Firm — Oblon, McClelland, Maier & Neustadt, L.L.P.

(57) ABSTRACT

A fluid treatment apparatus for treating a target fluid is provided. The fluid treatment apparatus includes a cylindrical reactor and one or more catalyst members each having a rod-like or plate-like shape extending in a longitudinal direction within the reactor. The cylindrical reactor decomposes an organic substance contained in a mixed fluid of the target fluid with an oxidant by an oxidation reaction under heat and pressure. The cylindrical reactor has an introduction port on one end and a discharge port on the other end. An upstream end surface, relative to a direction of flow of the target fluid, of each of the catalyst members is located in a downstream vicinity of or upstream from an inflow position where the target fluid flows into the reactor through the
(Continued)

introduction port. Each of the catalyst members is suspended with the upstream end surface being fixed.

9 Claims, 8 Drawing Sheets

(51) Int. Cl.
*C02F 1/44* (2006.01)
*C02F 1/72* (2006.01)
*C02F 11/06* (2006.01)
*C02F 101/36* (2006.01)
*C02F 1/02* (2006.01)
*C02F 101/30* (2006.01)

(52) U.S. Cl.
CPC ............... *C02F 1/02* (2013.01); *C02F 1/444* (2013.01); *C02F 2101/30* (2013.01); *C02F 2101/363* (2013.01); *C02F 2101/366* (2013.01)

(58) Field of Classification Search
CPC .... C02F 2101/363; C02F 11/06; C02F 11/08; C02F 11/083; C02F 11/086; B01J 19/0053; B01J 19/006; B01J 19/0066; B01J 19/32; B01J 24/2415; B01J 19/24; B01J 19/2415; B01J 19/26
See application file for complete search history.

(56) References Cited

U.S. PATENT DOCUMENTS

| | | |
|---|---|---|
| 2013/0153477 A1 | 6/2013 | Suzuki et al. |
| 2014/0048464 A1 | 2/2014 | Hayakawa et al. |
| 2014/0151277 A1 | 6/2014 | Aoki et al. |

FOREIGN PATENT DOCUMENTS

| | | |
|---|---|---|
| JP | 2002-273194 | 9/2002 |
| JP | 2005-200253 A | 7/2005 |
| JP | 2007-229553 | 9/2007 |
| JP | 2013-169541 | 9/2013 |
| JP | 2014-54617 A | 3/2014 |

OTHER PUBLICATIONS

U.S. Appl. No. 14/729,176, filed Jun. 3, 2015 Inventor : Zama, et al.
Office Action dated Apr. 3, 2018, in Japanese Patent Application No. 2014-134329 (w/ English translation), citing references AO-AQ.

\* cited by examiner

FLUID TREATMENT APPARATUS

CROSS-REFERENCE TO RELATED APPLICATIONS

This patent application is based on and claims priority pursuant to 35 U.S.C. § 119(a) to Japanese Patent Application No. 2014-134329, filed on Jun. 30, 2014, in the Japan Patent Office, the entire disclosure of which is hereby incorporated by reference herein.

BACKGROUND

Technical Field

The present invention relates to a fluid treatment apparatus for treating a target fluid.

Description of the Related Art

Supercritical water oxidation apparatuses which decompose and detoxify persistent substances such as dioxins and PCB (polychlorinated biphenyl) and organic fluids such as human excrement, sewage, livestock excreta, and industrial effluent are known.

For example, a hydrothermal oxidation apparatus and a supercritical water oxidation apparatus each of which transforms a target fluid including an organic substance into a non-toxic substance, such as carbon dioxide, water, or an inorganic salt, by subjecting the target fluid to an oxidation reaction using supercritical water and an oxidant are known.

In such apparatuses, the reaction typically takes place under a pressure in a range of 25 to 50 MPa and a temperature in a range of 500° C. to 700° C.

Such apparatuses need to be resistant to high temperatures of about 450° C. to 700° C. and high pressures of about 25 to 50 MPa, which causes inevitable increase in their size and cost.

An apparatus which accelerates an oxidation reaction is also known. In this apparatus, a mixed fluid of high-temperature and high-pressure water, having a temperature equal to or greater than the critical temperature of water and a pressure lower than the critical pressure of water, with an oxidant is brought into contact with a catalyst in a reactor.

This type of apparatus using catalyst is capable of causing an oxidation of persistent organic substances even at relatively low temperatures of about 250° C. to 500° C.

In addition, this apparatus is capable of treating the target fluid under a milder condition (e.g., under a pressure in a range of 0.5 to 20 MPa and a temperature in a range of 100° C. to 500° C.) compared to the supercritical water oxidation apparatus. This contributes to downsizing and cost reduction of the apparatus.

Figure 1A:
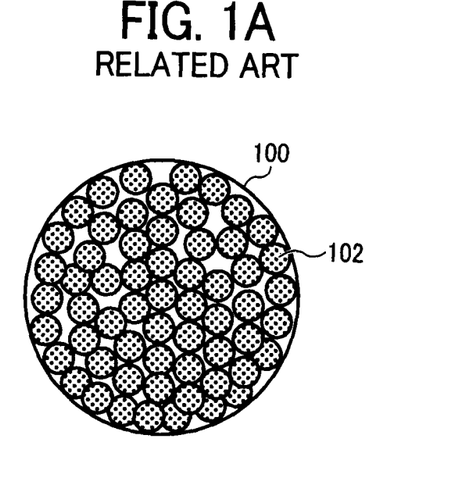
FIGS. 1A and 1B are transverse cross-sectional views of conventional reactors in which granular catalysts and a honeycomb structural catalyst are arranged, respectively.

One known method of arranging catalyst involves arranging a mesh-like container filled with granular catalysts 102 inside a cylindrical reactor 100 in such a manner that the granular catalysts 102 intersect with the direction of flow of a fluid, as illustrated in FIG. 1A. In this case, the fluid is allowed to migrate through interstices between the catalysts 102 while contacting the catalysts 102 in the axial (longitudinal) direction of the reactor 100.

Figure 1B:
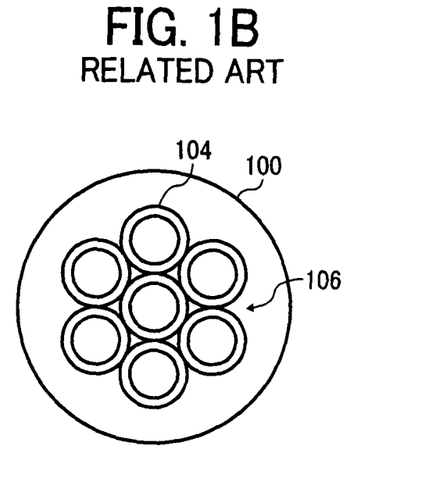

In this case, however, flow resistance is large and treatment efficiency is low. Another known method of arranging catalyst involves arranging a honeycomb structural catalyst 106 inside the reactor 100, as illustrated in FIG. 1B. The honeycomb structural catalyst 106 is formed by bonding multiple tubes 104 extending in the direction of flow of a fluid. Each of the tubes 104 has catalyst layers on its inner and outer peripheral surfaces.

In this case, the fluid is allowed to migrate within each tube. Therefore, flow resistance is smaller than the former case that uses granular catalysts.

The honeycomb structural catalyst may be disposed downstream from the reactor relative to the direction of flow of the fluid so that the target fluid and the oxidant come into contact with each other while being sufficiently mixed with each other.

In many cases, a target fluid to be treated by such types of treatment apparatuses contains an inorganic substance (including an inorganic solid). The inorganic substance becomes solid and precipitates in the reactor.

Specific examples of the inorganic substance include alumina, silica, zirconia, phosphate, nitrate, sulfate, and the like.

Superheated water vapor and supercritical water have high dissolving power for organic substances but low dissolving power for inorganic substances.

In the reactor filled with the granular catalysts, the mixed fluid flows through intergranular spaces formed between the granular catalysts.

Among numerous granular catalysts filling the reactor, on those located on the most upstream side relative to the direction of flow of the fluid, inorganic solids will adhere or accumulate intensively.

The inorganic solids will eventually plug the intergranular spaces formed between the granular catalysts located on the most upstream side.

Figure 2A:
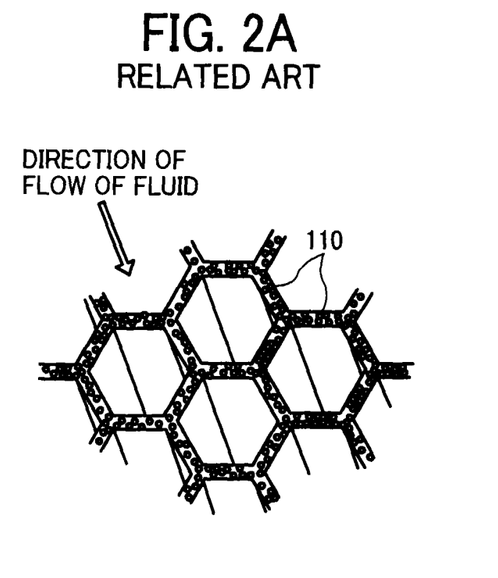
FIGS. 2A and 2B are perspective views of the honeycomb structural catalyst to/on which inorganic substances adhere or accumulate.

On the other hand, the honeycomb structural catalyst is less likely to be plugged with inorganic solids compared to granular catalysts, because multiple tubular spaces are secured, as illustrated in FIG. 2A.

However, inorganic solids 110 intensively adheres to the upstream end surface, relative to the direction of flow of the fluid, of the honeycomb structural catalyst because the upstream end surface is at a right angle to the direction of flow of the fluid.

Figure 2B:
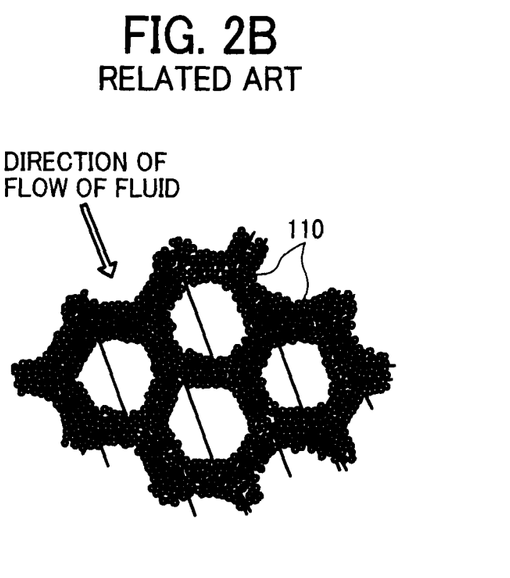

The accumulated blocks of the inorganic substance 110 adsorbed to the upstream end surface of the catalyst will grow toward the center of the outlet of each tube, as illustrated in FIG. 2B.

When the outlets are not so large, the outlets will be plugged so early that the flow of the mixed fluid into the honeycomb structural catalyst will be interrupted.

In particular, when the oxidation treatment is performed under the condition where water exists as superheated water vapor, the density of the fluid becomes smaller compared to the case where water exists as subcritical fluid. In this case, it is difficult to wash the adhered inorganic solids away toward a downstream side.

Accordingly, the inorganic substances are likely to accumulate in the direction of gravitational force.

SUMMARY

In accordance with some embodiments of the present invention, a fluid treatment apparatus for treating a target fluid is provided. The fluid treatment apparatus includes a cylindrical reactor and at one or more catalyst members each having a rod-like or plate-like shape extending in a longitudinal direction within the reactor. The cylindrical reactor decomposes an organic substance contained in a mixed fluid of the target fluid with an oxidant by an oxidation reaction under heat and pressure. The cylindrical reactor has an introduction port on one end and a discharge port on the other end. An upstream end surface, relative to a direction of flow of the target fluid, of each of the catalyst members is located in a downstream vicinity of or upstream from an inflow position where the target fluid flows into the reactor through the introduction port. Each of the catalyst members is suspended with the upstream end surface being fixed.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

The plugged portion of the catalyst substantially has no catalytic function. This situation is equivalent to the case where the surface area of the catalyst is reduced, which causes deterioration in treatment efficiency.

This situation is also equivalent to the case where the inner cross-sectional area of the reactor is reduced, which causes an increase in flow rate at the catalyst-set position and a decrease in retention time of the target fluid in the reactor.

When the retention time becomes shorter than a predetermined time, untreated fluid is discharged in larger amounts, resulting in deterioration in treatment efficiency.

In the case where the inorganic substance has accumulated in the reactor, the reactor needs cleaning.

Specifically, the cleaning requires the processes of suspending a treatment reaction, cooling a reaction system to normal temperature, opening the reactor by a worker, and removing the adhered inorganic substance from the reactor.

The smaller the inner diameter of the reactor becomes, the faster the inorganic substance accumulates, and the more frequently the maintenance of the reactor is performed.

As the maintenance of the reactor is performed more frequently, the treatment efficiency lowers and the running cost drastically increases with imposing a great labor on the worker.

In the case where the inorganic substance is firmly adsorbed to the catalyst with a large force, it may be impossible to remove the inorganic substance from the reactor.

In such a case, it is possible to reproduce the reactor by removing the catalyst layer to which the inorganic substance is adhered and forming a new catalyst layer. However, this procedure has a problem of wasting catalyst and time.

In view of this situation, one object of the present invention is to provide a fluid treatment apparatus which can achieve a low level of maintenance frequency, reduced running cost, and reduced labor, while maintaining a good level of treatment efficiency.

The fluid treatment apparatus in accordance with some embodiments of the present invention can achieve a low level of maintenance frequency, reduced running cost, and reduced labor, while maintaining a good level of treatment efficiency.

A first embodiment is described in detail with reference to FIGS. 3 to 5.

A fluid treatment apparatus according to an embodiment of the present invention is explained with reference to FIG. 3.

Figure 3:
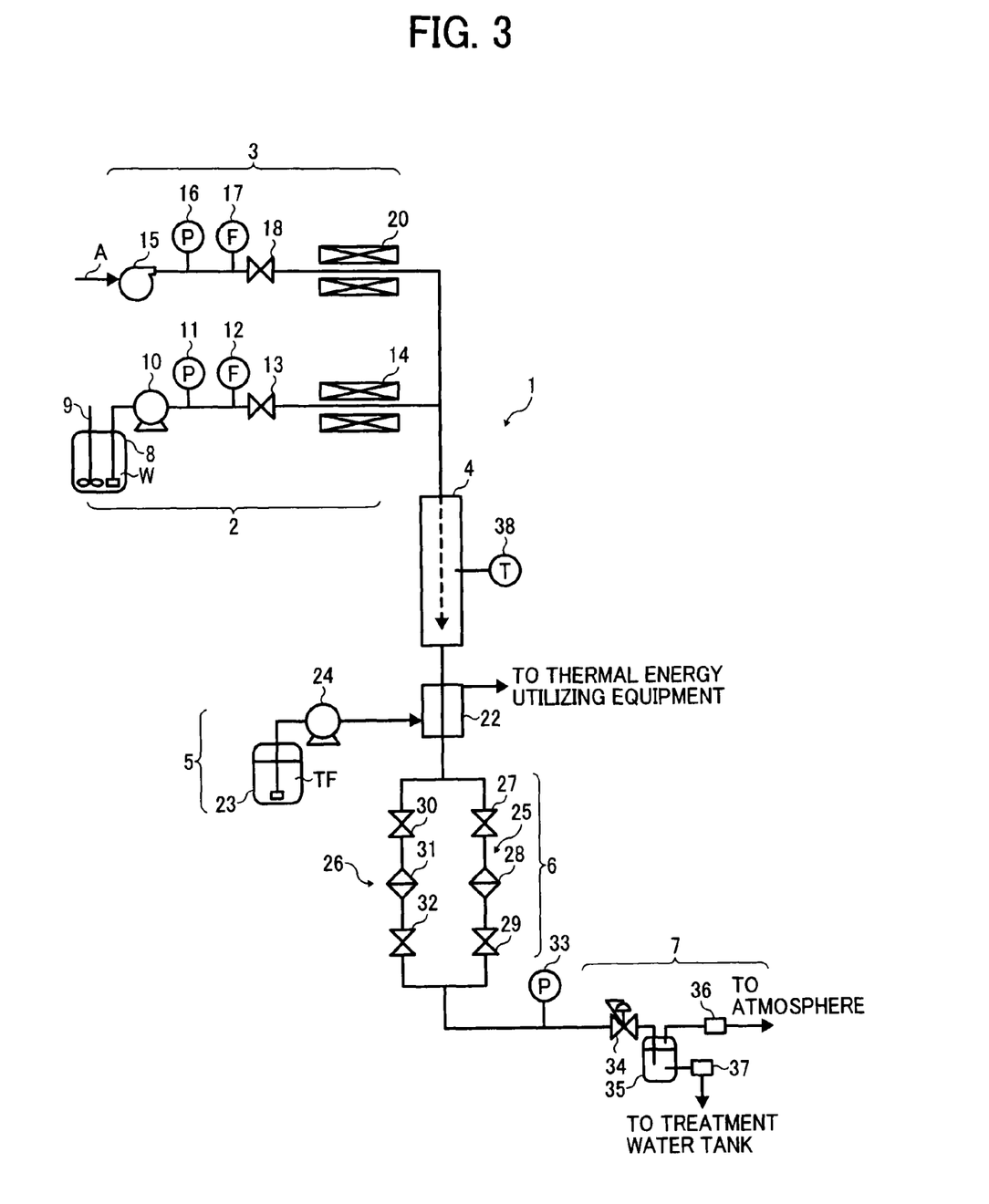
FIG. 3 is a schematic view of a fluid treatment apparatus according to a first embodiment of the present invention.

Referring to FIG. 3, a fluid treatment apparatus 1 includes a target fluid supply part 2, an oxidant supply part 3, a reactor 4, a heat exchange part 5, a solid separation part 6, a gas-liquid separation part 7, and a control part.

The target fluid supply part 2 has a raw water tank 8. The raw water tank 8 retains an untreated target fluid W including an organic substance.

The target fluid W is stirred by a stirrer 9 so that suspended solids (SS) are uniformly dispersed and the organic substance concentration is equalized therein.

The stirred target fluid W is pumped toward the reactor 4 by a raw water supply pump 10.

The pressure and flow rate of the target fluid W being pumped are detected by a raw water pressure gauge 11 and a raw water flow meter 12, respectively.

The flow rate of the target fluid W is adjustable by a raw water inlet valve 13.

The raw water inlet valve 13 functions as a check valve. The raw water inlet valve 13 allows the target fluid W pumped from the raw water supply pump 10 to flow from a raw-water-supply-pump-10 side to a reactor-4 side while preventing the target fluid W from flowing in the opposite direction.

The target fluid W having passed through the raw water inlet valve 13 is preheated by a raw water preheater 14 disposed surrounding the flow path for the target fluid W.

The oxidant supply part 3 has an oxidant feed pump 15 composed of a compressor.

The oxidant feed pump 15 pumps an air A that is incorporated as an oxidant toward the reactor 4 while compressing the air A to a pressure similar to that of the target fluid W.

The pressure and flow rate of the air A being pumped are detected by an oxidant pressure gauge 16 and an oxidant flow meter 17, respectively.

An oxidant inlet valve 18 functions as a check valve. The oxidant inlet valve 18 allows the air A pumped from the oxidant feed pump 15 to flow from an oxidant-feed-pump-15 side to a reactor-4 side while preventing the air A from flowing in the opposite direction.

The air A having passed through the oxidant inlet valve 18 is preheated by an oxidant preheater 20 disposed surrounding the flow path for the air A.

The target fluid W preheated by the raw water preheater 14 merges with the air A preheated by the oxidant preheater 20 to become a mixed fluid. The mixed fluid pours into the reactor 4.

Accordingly, the raw water preheater 14 is disposed upstream from the reactor 4 relative to the direction of pouring of the target fluid W.

The pressures for pumping the target fluid W and the air A are adjusted to a pressure similar to the inner pressure of the reactor 4.

In the present embodiment, the target fluid and the oxidant become a mixed fluid before pouring into the reactor 4. Alternatively, the target fluid and the oxidant may be separately introduced into the reactor 4 via separate paths and then become a mixed fluid in the reactor 4.

The quantity of the air A pumped by the oxidant feed pump 15 is determined based on the stoichiometric quantity of oxygen needed for completely oxidizing the organic substance in the target fluid W.

More specifically, the stoichiometric quantity of oxygen needed for complete oxidization of the organic substance is calculated based on the concentrations of total organic carbon (TOC), total nitrogen (TN), and total phosphor (TP) in the target fluid W.

The quantity of the air A to be pumped is determined based on the calculation result.

In particular, the quantity of the air A to be pumped is adjusted in such a manner that oxygen in an amount of from 1.0 to 3.0 times the stoichiometric quantity of oxygen needed for complete oxidization of the organic matter can be introduced.

Specific examples of the oxidant include air, oxygen, liquid oxygen, ozone, hydrogen peroxide water, and combinations thereof.

A pressure applied to the mixed fluid in the reactor 4 may be in the range of 0.5 to 30 MPa, more preferably 5 to 15 MPa.

The inner pressure of the reactor 4 is adjustable by an outlet valve 34. The outlet valve 34 automatically opens to discharge the mixed fluid from the reactor 4 when the inner pressure of the reactor 4 exceeds a threshold. Thus, the inner pressure of the reactor 4 is kept constant at around the threshold.

The temperature of the mixed fluid in the reactor 4 is raised by heat generated in an oxidation of the organic substance.

When the target fluid W includes an organic substance at high concentrations, the temperature of the mixed fluid may be raised to a desired value only by a large amount of heat generated in an oxidation of the large amount of the organic substance.

In such a case, it is possible that the raw water preheater 14 and oxidant preheater 20 are put into operation only at the time the apparatus is switched on, and then switched off upon initiation of the oxidation.

The temperature of the mixed fluid in the reactor 4 may be in the range of 100° C. to 600° C., more preferably 200° C. to 550° C.

The temperature is adjustable by adjusting the outputs of the raw water preheater 14 and oxidant preheater 20.

A temperature of 374.2° C. or more and a pressure of 22.1 MPa or more are respectively in excess of the critical temperature and pressure of both water and the air.

When such temperature and pressure conditions are employed, the mixed fluid becomes a supercritical fluid that has an intermediate property between a liquid and a gas. In the supercritical fluid, the oxidation of the organic substance proceeds quickly because the organic substance is well soluble in the supercritical fluid and well makes contacts with the air.

Alternatively, a temperature of 200° C. or more (preferably 374.2° C. or more) and equal to or less than that of the saturated vapor, and a pressure of less than 22.1 MPa (preferably 10 MPa or more) and equal to or less than that of the saturated vapor, which is relatively high, may be employed, to put the target fluid in the mixed fluid into a superheated water vapor in the reactor 4.

The temperature of the mixed fluid in the reactor 4 may be in the range of 100° C. to 700° C., more preferably 200° C. to 550° C.

In the reactor 4, the mixed fluid is put into a high-temperature and high-pressure state to accelerate an oxidation of the organic substance and ammonia nitrogen contained therein.

In the mixed fluid having reached an end of a catalyst layer (to be described later) relative to the direction of feed (flow) of the fluid in the reactor 4, the organic substance is almost completely oxidized.

The detailed configuration of the reactor 4 and mechanism of accelerating oxidation by catalyst are described later.

The treated fluid discharged from the reactor 4 then flows into a heat exchanger 22 in the heat exchange part 5.

The heat exchange part 5 has a heat medium tank 23 retaining a heat exchange fluid TF.

The heat exchange fluid TF is supplied to the heat exchanger 22 by a heat exchange pump 24.

The heat exchange fluid heated by the heat exchanger 22 is fed to a thermal energy utilizing equipment through a piping.

Specific examples of the thermal energy utilizing equipment include, but are not limited to, a power generator.

The power generator generates power by rotating a turbine by means of an air current which is generated when the heat exchange fluid, the pressure of which has been increased by application of heat, transits from a liquid state to a gaseous state.

A part of the heat exchange fluid passed through the heat exchanger 22 may be fed to a branched piping to be used for preheating of the target fluid W and/or the air A.

The heat exchanger 22 draws heat from the treated fluid. Thus, moisture in the fluid is cooled, and the fluid transits from a supercritical or superheated vapor state to a liquid state. The fluid in a liquid state enters the solid separation part 6.

On the other hand, oxygen and nitrogen in the mixed fluid transit from a supercritical state to a gaseous state.

The solid separation part 6 includes a first separation system 25 and a second separation system 26.

The first separation system 25 includes a first branch valve 27, a first separation filter 28, and a first drain valve 29.

Similarly, the second separation system 26 includes a second branch valve 30, a second separation filter 31, and a second drain valve 32.

Solid oxides precipitated in the reactor 4 are caught by the first separation filter 28 or the second separation filter 31.

The first separation system 25 and the second separation system 26 are used alternately.

When the first separation system 25 is in use, the valves in the second separation system 26 are closed. When the second separation system 26 is in use, the valves in the first separation system 25 are closed.

As the first separation filter 28 or the second separation filter 31 is plugged, an outlet pressure gauge 33 measures a change in pressure. In accordance with the measurement result, washing or replacement of the first separation filter 28 or the second separation filter 31 is performed.

The gas-liquid separation part 7 includes the outlet valve 34 and a gas-liquid separator 35.

The mixed fluid passed through the solid separation part 6 is separated into the treated water and a gas by the gas-liquid separator 35.

The composition of the gas separated by the gas-liquid separator 35 is detected by a gas chromatographic detector 36.

When the gas chromatographic detector 36 detects an undecomposed substance, an alarm is raised upon reception of an output signal from the gas chromatographic detector 36.

The TOC concentration in the liquid separated by the gas-liquid separator 35 is detected by a TOC analyzer 37.

When the TOC analyzer 37 detects a TOC concentration in excess of a threshold, an alarm is raised upon reception of an output signal from the TOC analyzer 37.

In the treated water, even a low-molecular organic substance, which cannot be completely removed by a biological treatment using activated sludge, has been completely oxidized. Accordingly, the treated water contains little or no suspended substance or organic substance.

Thus, the treated water as it is can be reused as industrial water.

The treated water further being subjected to a filtering treatment using an ultrafiltration membrane can be used as an LSI washing liquid.

The gas separated by the gas-liquid separator 35 is composed primarily of oxygen dioxide, nitrogen gas, and oxygen.

Immediate downstream from the heat exchanger 22, a heat exchanger outlet thermometer is provided to detect the temperature of the liquid.

The heat exchange pump 24 is drive-controlled so that the detection result by the heat exchanger outlet thermometer falls within a predetermined range.

When the detection result by the heat exchanger outlet thermometer reaches a predetermined upper-limit temperature, the drive quantity of the heat exchange pump 24 is increased to increase the supply of the heat exchange fluid to the heat exchanger 22, thereby enhancing the cooling function of the heat exchanger 22.

When the detection result by the heat exchanger outlet thermometer reaches a predetermined lower-limit temperature, the drive quantity of the heat exchange pump 24 is reduced to reduce the supply of the heat exchange fluid to the heat exchanger 22, thereby lowering the cooling function of the heat exchanger 22.

By the above control, the heat exchange quantity is appropriately adjusted and the treated fluid is kept at a constant temperature.

The heat exchanger 22 may be directly installed in the reactor 4.

When the organic substance concentration in the target fluid W is relatively high, a large amount of heat generates in an oxidation of the organic substance.

In this case, the raw water preheater 14 and oxidant preheater 20 are put into operation only in the early stages. After the oxidation of the organic substance has initiated, the heat generated in the oxidation of the organic substance is used for the control.

In particular, the temperature of the mixed fluid of the target fluid W with the air A can be spontaneously raised to a predetermined temperature owing to the heat generated in the oxidation of the organic substance.

The control part controls the raw water preheater 14 and oxidant preheater 20 to reduce output power or stop operation when a detection result by a reactor thermometer 38 that detects the temperature of the reactor 4 exceeds a predetermined temperature.

Thus, wasteful energy use is suppressed.

The control part is connected to the raw water preheater 14, oxidant preheater 20, reactor thermometer 38, raw water supply pump 10, and oxidant feed pump 15.

The control part is equipped with a touch panel for displaying temperature, pressure, flow rate, abnormal operation warning, failure content, and the like, and for inputting or changing set values.

In the case of abnormal operation, the apparatus is interlock-controlled by switching off the pumps and/or heaters or closing the inlet valves.

Specific examples of the abnormal operation include instrument fault, plugging or leakage at flow paths, and the like. The control part detects abnormal pressure and temperature. Users can monitor the abnormal operation though the touch panel.

The pressure in the reactor (from the inlet valve to the outlet valve) is directly controlled by the outlet valve 34 (back pressure valve) without the control part.

The configuration of the reactor 4 is described in detail with reference to FIGS. 4A and 4B.

The reactor 4 has an introduction port on one end and a discharge port on the other end. The reactor 4 decomposes an organic substance contained in a mixed fluid of the target fluid with an oxidant by an oxidation reaction under heat and pressure.

Figure 4A:
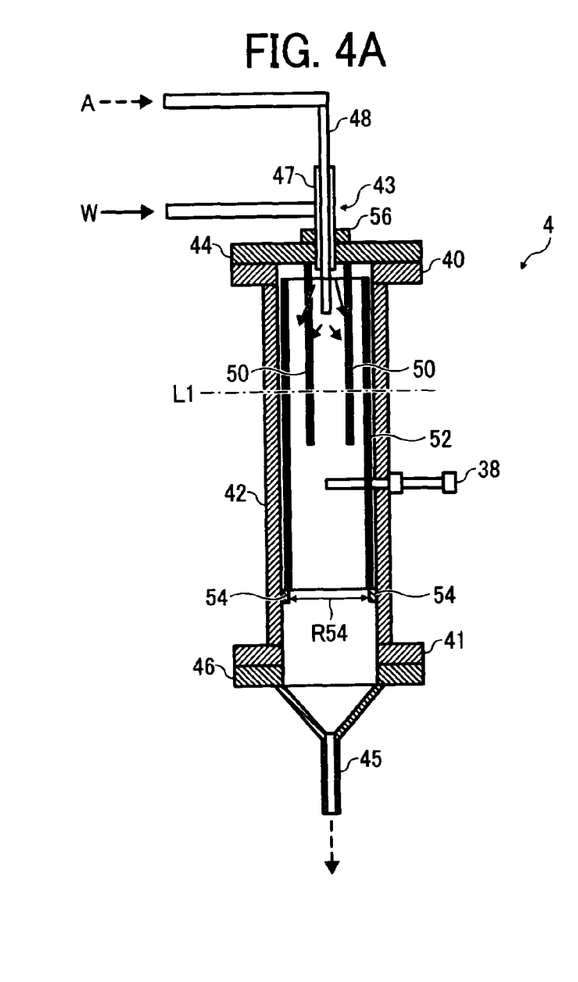
FIG. 4A is a cross-sectional view of a reactor according to the first embodiment and FIG. 4B is a transverse cross-sectional view taken from line L1 in FIG. 4A.

Referring to FIG. 4A, the reactor 4 is vertically extended and has a cylindrical reactor main body 42 integrated with an upper flange 40 and a lower flange 41.

To the upper flange 40, an upper lid member 44 having an introduction port 43 for introducing a fluid into the reactor 4 is fixed. To the lower flange 41, a bottom lid member 46 having a discharge port 45 for discharging the treated fluid is fixed.

The upper lid member 44 and bottom lid member 46 may be integrated with the reactor main body 42. In view of maintainability, however, it is preferable that at least one of them is detachable.

In the present embodiment, the upper lid member 44 is detachable.

The reactor 4 has a space for securing time for reaction while maintaining high degrees of temperature and pressure.

The introduction port 43 includes a target fluid inflow pipe 47 for introducing the target fluid W into the reactor 4 and a small-diameter oxidant inflow pipe 48 for introducing the air A into the reactor 4. The introduction port 43 has a double-pipe structure such that the oxidant inflow pipe 48 is inserted in the target fluid inflow pipe 47.

The insertion length of the oxidant inflow pipe 48 into the reactor 4 is longer than that of the target fluid inflow pipe 47.

The target fluid W pumped by the raw water supply pump 10 flows into the reactor 4 through the target fluid inflow pipe 47 and flows from an upper side to a lower side of the reactor 4 in a longitudinal direction.

The air A pumped by the oxidant feed pump 15 flows into the reactor 4 through the oxidant inflow pipe 48 and becomes mixed with the target fluid W.

In the mixed fluid having reached the bottom of the reactor 4, the organic substance is almost completely oxidized. Such a treated mixed fluid is discharged from the discharge port 45.

Depending on the type of the target fluid W, hydrochloric acid derived from chloro groups in organic chlorides and/or sulfuric acid derived from sulfonyl groups in amino acid may generate in the reactor, and the inner wall of the reactor may be exposed to strong acids.

In view of this, the reactor may take a double structure composed of an outer pressure-resistant cylinder and an inner corrosion-resistant cylinder housed within the outer cylinder.

Specific examples of the inner corrosion-resistant cylinder include a cylinder composed of titanium.

In addition, a cylinder composed of Ta, Au, Pt, Ir, Rh, or Pd can also be used.

Moreover, a cylinder composed of an alloy containing at least one of Ti, Ta, Au, Pt, Ir, Rh, and Pd can also be used.

Specific examples of the outer pressure-resistant cylinder include a thick-wall cylinder composed of a high-strength metallic material such as stainless steel (e.g., SUS304, SUS316) and Inconel® 625.

In the case where the difference in thermal expansion coefficient between the outer and inner cylinders is greatly different, it is possible to provide a gap between the outer and inner cylinders and fill the gap with pressure equalizing water.

Inside the reactor 4, a catalyst member is provided.

In particular, the presence of a catalyst is effective for completely decomposing organic substances particularly under superheated water vapor.

Even when undecomposed organic substances and/or ammonia nitrogen remain, the catalyst accelerates oxidation and completes the treatment.

Configuration and material for the catalyst member are described below.

To the lower surface of the upper lid member 44, multiple (six, in the present embodiment) catalyst members 50 are fixed. Each of the catalyst members 50 has a rod-like shape (cylindrical shape) extending in the direction of flow of the fluid (i.e., downward).

The upstream ends, relative to the direction of flow of the fluid, of the catalyst members 50 are located near the inflow position where the target fluid W flows into the reactor 4 through the introduction port 43. The catalyst members 50 are suspended with the upstream ends thereof being fixed.

Figure 4B:
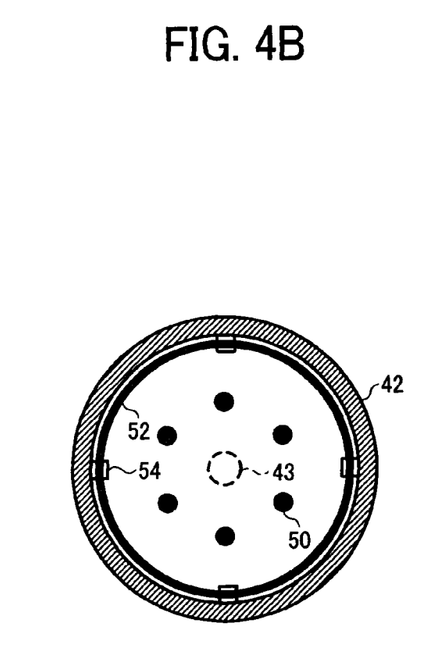

The multiple catalyst members 50 are arranged at regular intervals in a circumferential direction relative to the introduction port 43, as illustrated in FIG. 4B. In other words, the multiple catalyst members 50 are arranged radially from the oxidant inflow pipe 48.

The fixation of the catalyst members 50 to the upper lid member 44 can be achieved by detachable means such as screw-in means.

In this case, it is possible to detach the catalyst members 50 from the upper lid member 44 after the upper lid member 44 is unmounted, facilitating inorganic substance removal operation and replacement operation.

Figure 5:
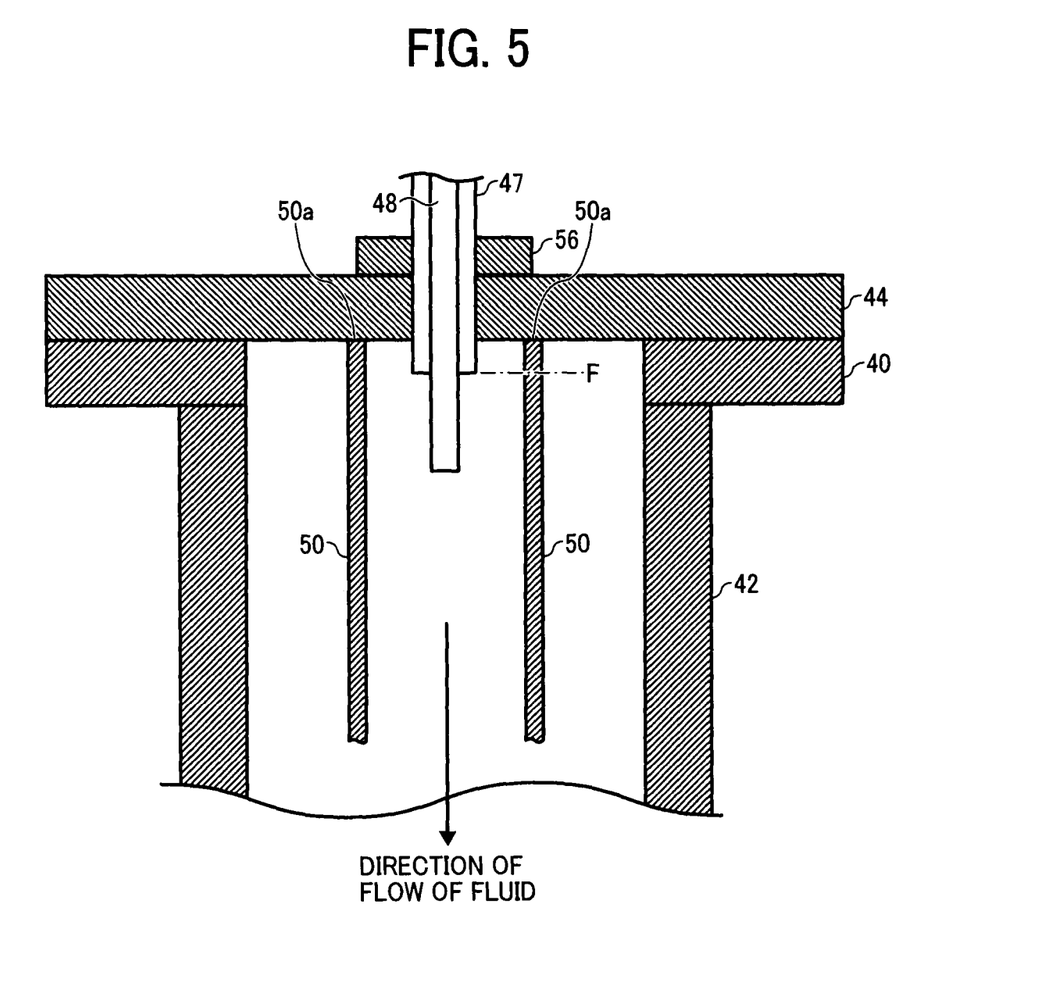
FIG. 5 is a magnified view of an upper end part of FIG. 4A.

More specifically, as illustrated in FIG. 5, an upstream end surface 50a of each catalyst member 50 is located not downstream from an inflow position F where the target fluid W flows into the reactor 4. In addition, the upstream end 50a is covered with the lower surface of the upper lid member 44 and not exposed to the space within the reactor 4.

Accordingly, although the upstream end surface 50a is intersecting the direction of flow of the fluid, adherence or accumulation of inorganic substances to/on the upstream end surface 50a, which may eventually cause flow path plugging, does not occur.

Even in the case where the upstream end surface 50a is exposed to the space within the reactor 4, adherence or accumulation of inorganic substances to/on the upstream end surface 50a is less likely to occur because the upstream end surface 50a is located within a region where the initial stage of the oxidation reaction proceeds, in other words, a region where inorganic substance will precipitate in small amounts.

In addition, because the upstream end surface 50a is located not downstream from the inflow position F, adherence or accumulation of inorganic substances to/on the upstream end surface 50a is more suppressed.

It is to be noted that, within the region where the initial stage of the oxidation reaction proceeds, no substantial problem will arise even if the upstream end surface 50a is located in a downstream vicinity of the inflow position F. On the other hand, there is no limit in the position of the upstream end surface 50a at upstream sides from the inflow position F.

Referring to FIG. 4B, the catalyst members 50 are arranged at intervals with forming sufficient spaces therebetween. Owing to such a configuration, inorganic substances are less likely to accumulate on the catalyst members 50.

The catalyst members 50 with such a configuration can be reduced in maintenance frequency compared to those with a conventional configuration.

Moreover, in the present embodiment, because the upstream end surface 50a is not exposed to the space within the reactor 4, a possibility that convection flow of the mixed fluid makes inorganic substances adhere to the upstream end surface 50a can be completely removed, thereby enhancing the accuracy of maintenance frequency reduction.

In the present embodiment, a cylindrical catalyst member 52, serving as the second catalyst member, is arranged around the catalyst members 50.

The downstream end surface, in the direction of flow of the fluid, of the catalyst member 52 is placed on protruding portions 54 provided on the inner periphery of the reactor 4.

The amount of protrusion of the protruding portions 54 in the radial direction is several millimeters.

The outermost diameter of the catalyst member 52 is adjusted to become slightly greater than the smallest diameter of the protruding portions 54 (represented by R54 in FIG. 4A) during normal temperatures (shutdown period) and reaction temperatures (operation period), so that the catalyst member 52 will not fall down from the protruding portions 54 even if diameter change is caused by heat.

Because the catalyst member 52 is just put on the protrusion portions 54 without being fixed, the reactor main body 42 and the catalyst member 52 will not mechanically stressed even when they change their sizes due to thermal expansion.

The number of the protruding portions 54 is not limited to any particular value so long as the catalyst member 52 is stably placed thereon. In the embodiment illustrated in FIG. 4B, the number of the protruding portions 54 is four. Alternatively, the protruding portions 54 can be replaced with a ring-like protrusion continuous in the circumferential direction.

In FIG. 4A, a numeral 56 denotes a seal member.

At the outer-periphery side of the flow path, the catalyst member 52 accelerates oxidation. Within the region surrounded by the catalyst member 52, the multiple catalyst members 50 accelerate oxidation without blocking flow of the fluid.

As the temperature is raised in accordance with the occurrence of an oxidation reaction in the reactor, the target fluid transforms into a gaseous state.

As the target fluid becomes gaseous, the mass transfer rate is increased. Accordingly, the target fluid can come into contact with the catalyst member 52 provided on the inner-periphery side of the reactor with a higher probability.

In view of this, the length of the catalyst member 50 is set to approximately a half of the longitudinal length of the reactor 4, as shown in FIG. 4A. Within the region below the catalyst members 50, oxidation is accelerated only by the catalyst member 52.

The catalyst member 52 may be in the form of a layer or film provided on the inner periphery of the reactor 4.

Each of the catalyst members 50 and 52 is formed of a base material covered with a catalyst layer containing a catalytic substance.

The catalyst layer, at least the surface thereof, is composed of a catalytic substance that accelerates oxidation of organic substances.

Specific examples of the catalytic substance include, but are not limited to, Ru, Pd, Rh, Pt, Au, Ir, Os, Fe, Cu, Zn, Ni, Co, Ce, Ti, Mn, and a compound containing at least one of these materials.

Compared to the conventional filling-type catalysts, the catalyst members 50 and 52 are inevitably smaller in surface area. Therefore, catalytic substances exhibiting high catalytic ability for organic substances in the target fluid are preferably used.

Specific examples of materials composing the base material include, but are not limited to, an alloy containing at least one of Fe, Ni, Cr, and Mo.

Specific examples of materials composing the base material further include, but are not limited to, Ti, Ta, Au, Pt, Ir, Rh, Pd, Zr, V, an alloy containing at least one of these materials, ceramic, and quartz glass.

An appropriate material can be selected from these materials in view of the requirements, such as cost, workability, ease of covering, mechanical strength, heat resistance under the reaction condition, and corrosion resistance.

Figure 6:
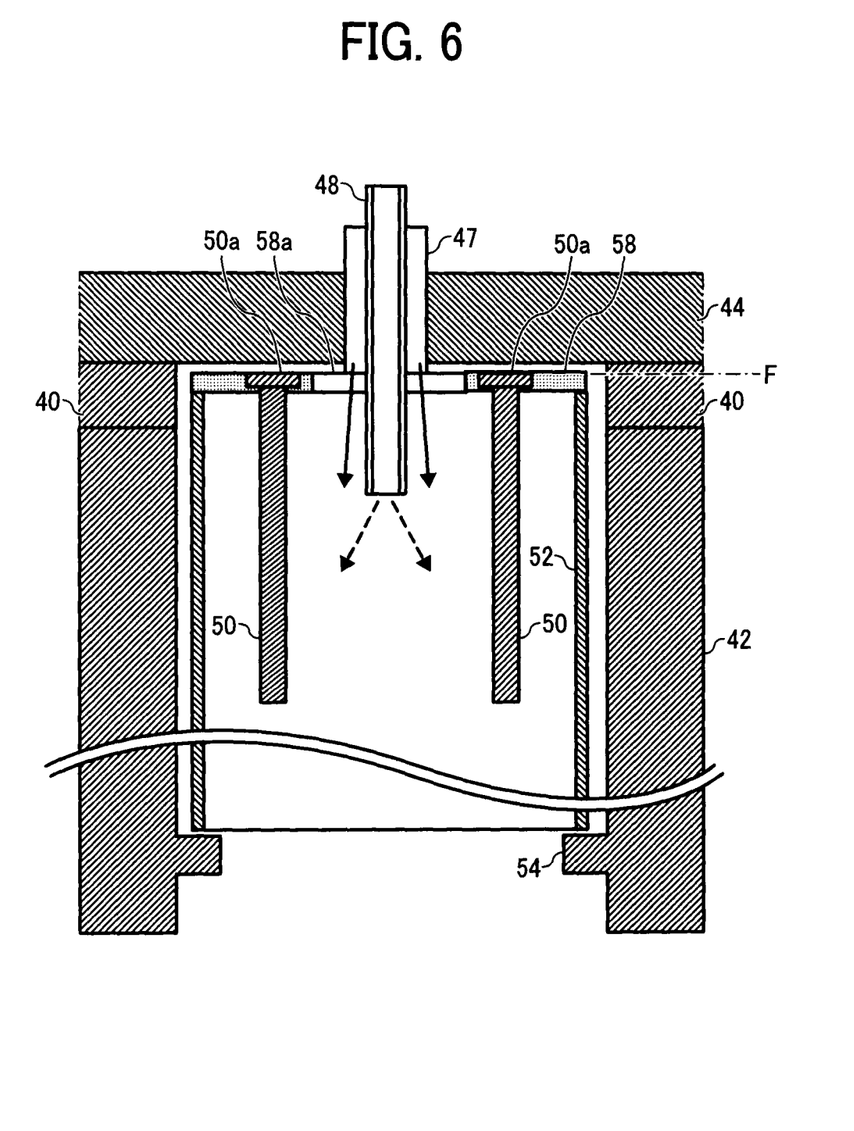
FIG. 6 is a longitudinal cross-sectional view of a reactor according to a second embodiment of the present invention.

A second embodiment is illustrated in FIG. 6.

For the sake of simplicity, the same reference number will be given to identical constituent elements such as parts and materials having the same functions and redundant descriptions thereof omitted unless otherwise stated.

In this embodiment, catalyst member cleaning operation (i.e., inorganic substance removing operation) and replacement operation are more facilitated.

The catalyst members 50 are supported by a disc-like holding member 58 placed on the upper end surface of the catalyst member 52.

At a central part of the holding member 58, an opening 58a for passing the fluid is formed. Multiple insertion holes are formed at intervals in a circumferential direction relative to the opening 58a.

The upstream end of each of the catalyst members 50 is formed into a large-diameter part. Each of the insertion hole has a step-like shape to fit the large-diameter part. The catalyst members 50 are inserted into the holding member 58 and just supported by their own weights.

The upstream end surfaces 50a of the catalyst members 50 are located not downstream from but on the same level as the inflow position F.

At the time of cleaning the catalyst members, the upper lid member 44 is unmounted first, the holding member 58 is then drawn up, and the catalyst members 50 are pulled up.

The catalyst member 52, just being put on the protruding portions 54, is then drawn up.

Alternatively, the holding member 58 may have a ring-like protrusion on its outer peripheral end to fit an inner or outer side of the catalyst member 52.

Figure 7:
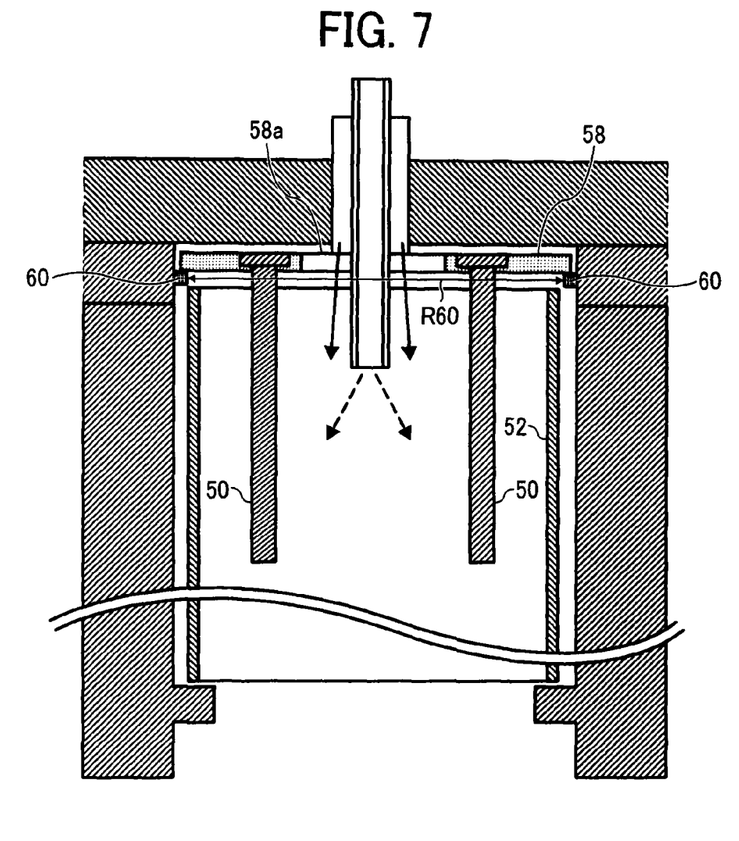
FIG. 7 is a longitudinal cross-sectional view of a variation of the reactor illustrated in FIG. 6.

Alternatively, as illustrated in FIG. 7, the holding member 58 may be placed on protruding portions 60 provided on the inner periphery of the reactor, in the same manner as the catalyst member 52 placed on the protruding portions 54. In this case, the amount of protrusion of the protruding portions 60 is smaller than that of the protruding portions 54.

The inner diameter of the protruding portions 60 (represented by R60 in FIG. 7) is slightly larger than the outermost diameter of the catalyst member 52 so that the catalyst member 52 can be taken out from above.

In each embodiment described above, each of the suspension-type catalyst members 50 has a rod-like shape. Alternatively, the catalyst member 50 may have a flat-plate-like or corrugated-plate-like shape, as illustrated in FIG. 8A or 8B, respectively.

Figure 8A:
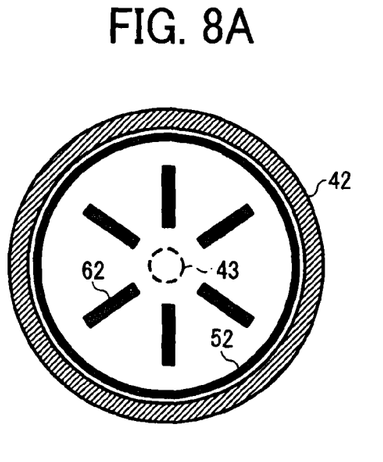
FIGS. 8A and 8B are transverse cross-sectional views of variations of the catalyst members.

With respect to a flat-plate-like catalyst member 62 illustrated in FIG. 8A, the base material is formed into a flat plate having a small thickness. This configuration can make the flow resistance small and the surface area of the catalyst layer large.

Because pressure resistance is not required in the reactor 4, the thickness of the base material can be small.

Figure 8B:
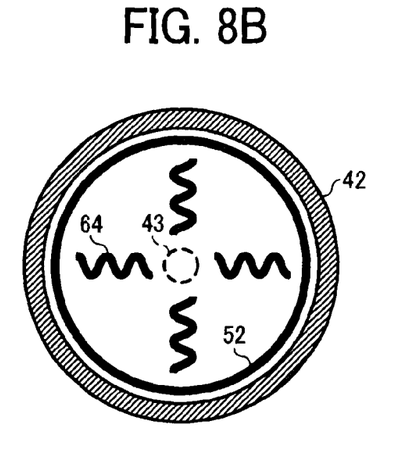

With respect to a corrugated-plate-like catalyst member 64 illustrated in FIG. 8B, the base material is formed into a corrugated plate. The corrugated-plate-like catalyst member 64 can make the surface area of the catalyst layer much larger than the flat-plate-like catalyst member 62.

Such plate-like catalysts have a smaller cross-sectional area compared to catalysts in the form of a circular or polygonal column having the same surface area, making the flow resistance small.

In addition, catalysts in a jagged shape which can be formed by folding a plate, or in a cross-like shape which can be formed by crossing planes, are advantageous in terms of increased surface area.

The larger the surface area, the higher the contact probability of the mixed fluid with the catalyst and the degree of oxidation decomposition.

A third embodiment is illustrated in FIGS. 9A-9C and FIG. 10.

Figure 9A:
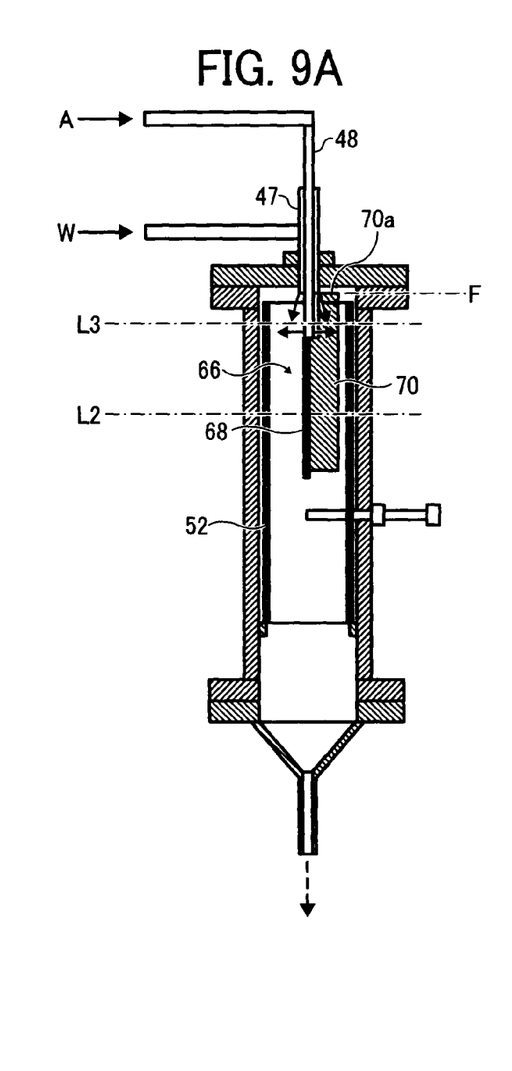
FIG. 9A is a longitudinal cross-sectional view of a reactor according to a third embodiment of the present invention and FIGS. 9B and 9C are transverse cross-sectional views taken from lines L2 and L3, respectively, in FIG. 9A.

In the present embodiment, a catalyst member 66 is composed of a rod-like (or columnar) base catalyst 68 and multiple plate-like catalysts 70. The base catalyst 68 is connected to the downstream end surface, relative to the direction of flow of the fluid, of the oxidant inflow pipe 48. The plate-like catalysts 70 are protruding from the base catalyst 68 in the radial direction in the reactor.

Figure 9B:
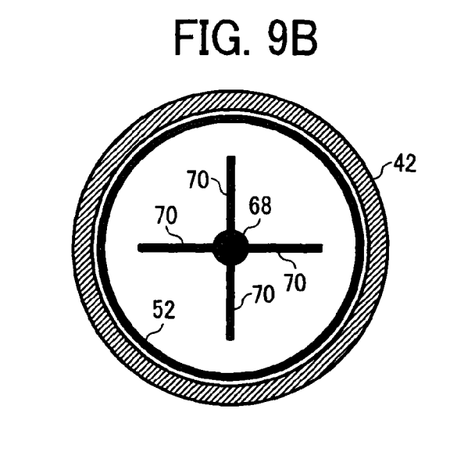

As illustrated in FIG. 9B, the plate-like catalysts 70 are crisscrossing with each other.

Figure 10:
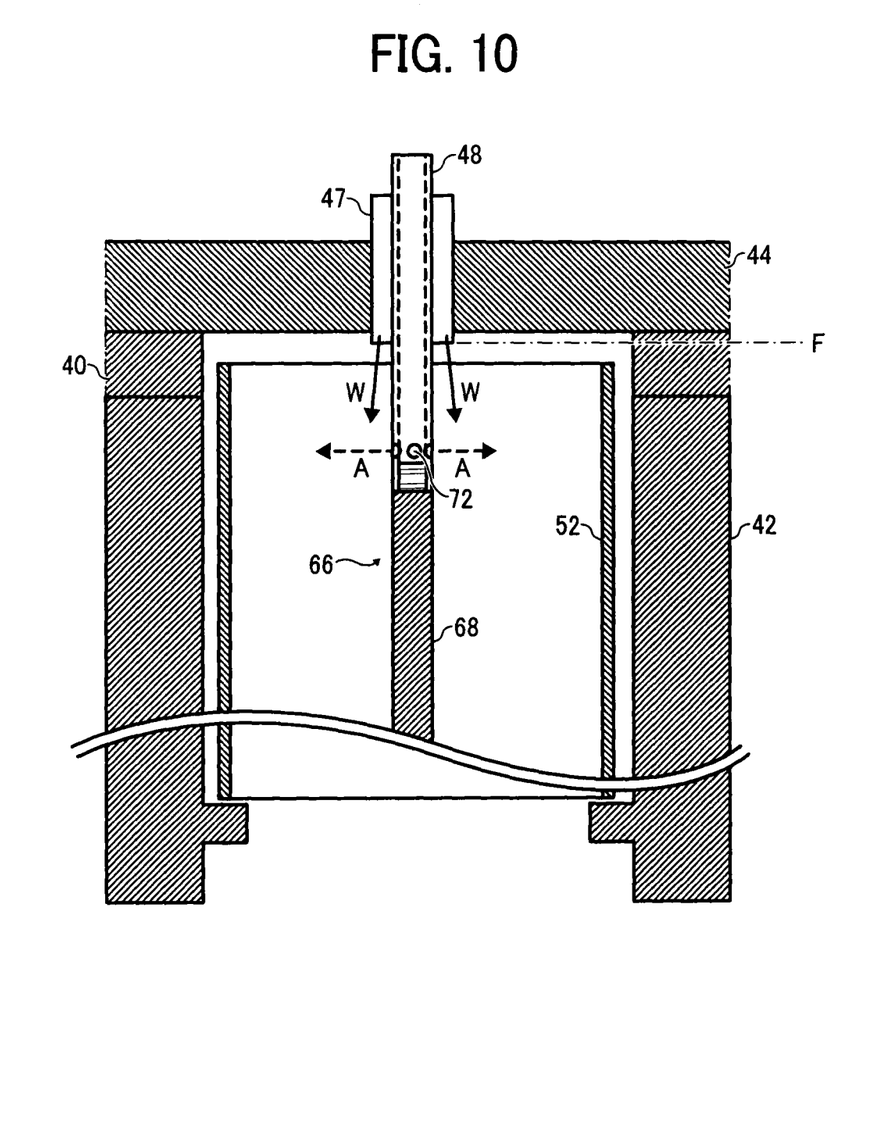
FIG. 10 is a magnified view of a major part of the reactor according to the third embodiment.

As illustrated in FIG. 10, the base catalyst 68 is screwed in a female screw part formed on the downstream end part of the oxidant inflow pipe 48. Thus, the base catalyst 68 is connected to the oxidant inflow pipe 48 in series.

The outer diameter of the base catalyst 68 is not in excess of that of the oxidant inflow pipe 48. (In the present embodiment, they are equal.) Therefore, the upstream end surface of the base catalyst 68 is not exposed within the reactor 4.

Accordingly, to the upstream end surface of the base catalyst 68, inorganic substances never adhere.

Because the downstream end part of the oxidant inflow pipe 48 is covered with the base catalyst 68, the direction of discharge of the air A from the oxidant inflow pipe 48 intersects the direction of flow of the fluid. (In the present embodiment, they are at right angles to each other.)

More specifically, at the downstream end part of the oxidant inflow pipe 48, multiple lateral holes 72 are formed at intervals in a circumferential direction, and the air A blows out from the lateral holes 72.

Because the target fluid W flows into the reactor 4 in a longitudinal direction while the air A blows out in a direction orthogonal to the longitudinal direction, the target fluid W becomes mixed with the air A easily.

Compared to the case where the target fluid W and the air A flow in the same direction, they become mixed with each other much easier, which contributes to improvement in the degree of oxidation decomposition.

Referring to FIG. 9A, the upstream end part of the plate-like catalyst 70 is extending above the lateral holes 72.

The upper part pf the plate-like catalyst 70 on the oxidant-inflow-pipe-48-side has a cutout so as not to disturb flow of the target fluid W. An end surface 70a, composing at least a part of the upstream end surface, is located not downstream from the inflow position F.

Accordingly, adherence of inorganic substances to the end surface 70a can be suppressed.

Figure 9C:
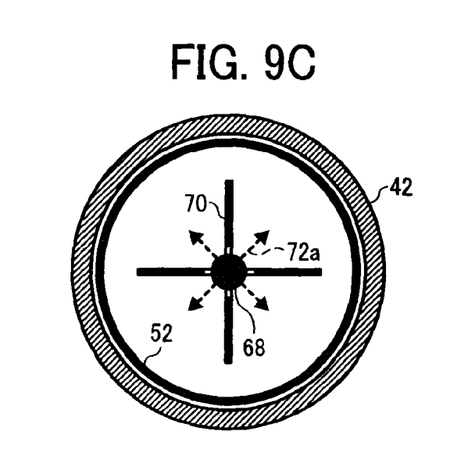

Referring to FIG. 9C, the portion where the oxidant discharges in a direction 72a and the position where the plate-like catalyst 70 is protruding is displaced in a circumferential direction.

This configuration suppresses adherence of inorganic substances, precipitated when the mixed fluid becomes superheated water vapor, to the side surfaces of the cutout of the plate-like catalyst 70.

In the present embodiment, the plate-like catalyst 70 has a flat-plate-like shape.

Alternatively, the plate-like catalyst 70 may have a corrugated-plate-like shape.

EXPERIMENT A

A waste water (i.e., target fluid) is put into a superheated vapor state and mixed with the air. The mixed fluid is subjected to an oxidation decomposition treatment with the fluid treatment apparatus illustrated in FIG. 3.

Because this experiment is for a comparison purpose, there is no problem even if organic substances are undecomposed (or the residual rate of organic substances is high). The inorganic solid concentration in the model waste water is 1%, which is 10 times the normal concentration.

Experimental Conditions
  Target fluid: Model waste water (5% MeOH aqueous solution containing 1% of silica and alumina powders as inorganic solids)
  Oxidant: Air
  Preheating temperature: 400° C. at the air side. At the waste water side, 350° C. at start-up time and 325° C. during stable operation.
  Pressure: 10 MPa
  Reaction temperature: 400° C.-500° C.
  Retention time: About 60 seconds
  Reactor structure: Outer cylinder: Inconel®. Inner cylinder: Titanium. Approximately-cylindrical vertical shape.
  Direction of flow: The air and waste water flow through the inner and outer inflow pipes, respectively, from an upper side to a lower side, as illustrated in FIG. 4A.

At the time the fluid treatment apparatus starts operation, the preheaters (the raw water preheater 14 and oxidant preheater 20) are put into operation to heat the air and a 4% MeOH aqueous solution to about 400° C. and 350° C., respectively.

Under a predetermined high-pressure condition, the air and the MeOH aqueous solution become a mixed fluid in the reactor, and the mixed fluid transits to a superheated water vapor state. Organic substances contained in the fluid are rapidly dissolved and precipitously subjected to hydrolysis, pyrolysis, and oxidation decomposition.

As oxidation decomposition occurs actively, heat generates in large amounts, thereby increasing the temperature inside the reactor.

The concentration of the MeOH aqueous solution is increased to 5% in a stepwise manner. The temperature of the waste-water-side preheater is reduced to about 325° C. while monitoring the temperature inside the reactor so that the temperature does not exceed the upper-limit temperature.

At this time, it is assumed that the mixed fluid is in a mixed state of gas with liquid.

After the combustion is stabilized, the content of the raw water tank, i.e., the MeOH aqueous solution, is replaced with the model waste water, and the treatment of the waste water is started.

When the temperature of the preheater is higher than the predetermined temperature, the temperature of the preheater is reduced, and the mixing ratio of the waste water to the raw water, i.e., the organic substance concentration, is increased.

Catalyst Conditions in Example 1
  Catalyst configuration: A combination of the plate-like catalysts illustrated in FIG. 8A and the cylindrical catalyst member 52.
  Base material: SUS
  Catalytic substance: Pd, supported by the based material.
  The longitudinal length of the catalyst member 52 is approximately three-quarters of that of the reactor.
  The longitudinal length of the plate-like catalyst 70 is approximately a half of that of the reactor. The width of the plate-like catalyst 70 is 30 mm.
  The reactor has an inner diameter of 100 mm and a height of 1,000 mm, and the total catalyst surface area of the plate-like catalysts and the cylindrical catalyst comes to approximately 410,000 mm$^2$. (The outer-periphery side of the cylindrical catalyst is not considered in the calculation because little or no gap is formed.)

Catalyst Conditions in Comparative Example 1
  Catalyst configuration: A cylindrical catalyst member only.
  Base material: SUS
  Catalytic substance: Pd, supported by the based material.
  The catalysis surface area is 230,000 mm$^2$.

Catalyst Conditions in Comparative Example 2
  Catalyst configuration: A honeycomb structural catalyst in a grid pattern.
  Base material: SUS
  Catalytic substance: Pd, supported by the based material.

The height of the catalyst is approximately a quarter of the length of the reactor. The grid interval is 5 mm. The catalyst surface area is approximately 1,020,000 mm², which is far greater than that in Example 1.

Experimental results are shown in Table 1.

TABLE 1

| | Catalyst Configuration | Catalyst Surface Area (mm²) | Initial Stage | After 3 hours | After 200 hours |
|---|---|---|---|---|---|
| Example 1 | 6 Plate-like Catalysts + Cylindrical Catalyst | 410,000 | A | A | A |
| Comparative Example 1 | Cylindrical Catalyst | 230,000 | A | A | A |
| Comparative Example 2 | Honeycomb Structural Catalyst | 1,020,000 | A | B | — |

A: Residual TOC concentration is less than 100 mg/L
B: Residual TOC concentration is not less than 100 mg/L and less than 1,000 mg/L
C: Residual TOC concentration is not less than 1,000 mg/L As a result of the experiment, either Example 1 and Comparative Examples 1 and 2 exhibit excellent decomposition property in the initial stage.

The decomposition property is evaluated by analyzing the discharged treated liquid with a TOC analyzer.

The initial decomposition performance in Comparative Example 1, with the smallest catalysis surface area, is represented by a TOC concentration of 50 mg/L. On the other hand, the initial decomposition performance in Example 1 is represented by a TOC concentration of 9 mg/L, which indicates very high decomposition performance.

After 3 hours of operation, the decomposition property has not been changed very much from the initial stage in Example 1 and Comparative Example 1, but has been drastically degraded in Comparative Example 2. Thus, Comparative 2 is bring to a stop.

Example 1 and Comparative Example 1 are subsequently subjected to a long-run operation for about 200 hours.

After 200 hours of operation, although the decomposition property has been slightly degraded from the initial stage in Comparative Example 1, the initial performance is nearly maintained in both Example 1 and Comparative Example 1.

After the termination of operation, the inside of the reactor is visually observed. As a result, slight adherence of inorganic solids to the catalyst is observed, but no plugging with inorganic solids is observed in the reactor in both Example 1 and Comparative Example 1.

On the other hand, in Comparative Example 2, parts of grids are plugged with inorganic substances.

These results indicate that the fluid treatment apparatus according to an embodiment of the present invention provides excellent decomposition performance for an extended period of time.

These results also indicate that decomposition performance is influenced by the shape and configuration of the catalyst member. A greater surface area is not always good, as shown by Comparative Example 2.

In Example 1, suspension-type catalyst members and a cylindrical catalyst member are combined. It is clear from the above experimental results that excellent decomposition performance can be maintained for an extended period of time even when the cylindrical catalyst member is replaced with a number of suspension-type catalyst members enough for substituting the catalytic function of the cylindrical catalyst member.

EXPERIMENT B

Another experiment is performed to determine a difference in treatment performance in whether the cylindrical catalyst member 52 contains suspension-type catalyst members (i.e., plate-like catalysts 70) or not, with changing the concentration of the model waste water.

The concentration of the model waste water is changed from 5% to 7%.

The preheating temperatures are also changed from Experiment A as follows: 400° C. at the air side; and at the waste water side, 350° C. at start-up time and 312° C. during stable operation.

As oxidation decomposition occurs actively, heat generates in large amounts, thereby increasing the temperature inside the reactor. The concentration of the MeOH aqueous solution is increased to 7% in a stepwise manner. The output of the waste-water-side preheater is reduced while monitoring the temperature inside the reactor so that the temperature does not exceed the upper-limit temperature. At this time, the preheating temperature indicates 312° C., and it is assumed that the mixed fluid is in a mixed state of gas with liquid.

Experimental results are shown in Table 2. The reactor configurations in Example 1' and Comparative Example 1' are equivalent to those in Example 1 and Comparative Example 1, respectively.

TABLE 2

| | Catalyst Configuration | Catalyst Surface Area (mm²) | Initial Stage | After 3 hours | After 200 hours |
|---|---|---|---|---|---|
| Example 1' | 6 Plate-like Catalysts + Cylindrical Catalyst | 410,000 | A | A | A |
| Comparative Example 1' | Cylindrical Catalyst | 230,000 | B | B | B |

A: Residual TOC concentration is less than 100 mg/L
B: Residual TOC concentration is not less than 100 mg/L and less than 1,000 mg/L
C: Residual TOC concentration is not less than 1,000 mg/L The decomposition property is evaluated by analyzing the discharged treated liquid with a TOC analyzer. The initial decomposition performance in Comparative Example 1', with the smallest catalysis surface area, is represented by a TOC concentration of approximately 180 mg/L. On the other hand, the initial decomposition performance in Example 1' is represented by a TOC concentration of 60 mg/L.

After 3 hours and 20 hours of long-run operations, the initial performance in nearly maintained in both Example 1' and Comparative Example 1'.

After the termination of operation, the inside of the reactor is visually observed. As a result, slight adherence of inorganic solids to the catalyst is observed, but no plugging with inorganic solids is observed in the reactor in both Example 1' and Comparative Example 1'.

These results indicate that the fluid treatment apparatus according to an embodiment of the present invention provides relatively excellent decomposition performance for an extended period of time even when the concentration is increased and the preheating temperature is decreased.

It is confirmed in Experiment A that oxidation decomposition proceeds only by use of a cylindrical catalyst member under a proper reaction condition such that the target fluid is put into a superheated water vapor state and mixed with the air.

In the case where the organic substance concentration is high, as in the present embodiment, it may take a longer time for the apparatus to perform the decomposition because the preheating temperature is reduced and the waste water is introduced with a large amount of liquid phase.

In this case, deterioration in oxidation decomposition property can be suppressed if suspension-type catalyst members are disposed in the vicinity of the inflow pipes in addition to the cylindrical catalyst disposed on the inner peripheral side of the reactor.

In Example 1', suspension-type catalyst members and a cylindrical catalyst member are combined. It is clear from the above experimental results that excellent decomposition performance can be maintained for an extended period of time even when the organic substance concentration is high and the cylindrical catalyst member is replaced with a number of suspension-type catalyst members enough for substituting the catalytic function of the cylindrical catalyst member.

What is claimed is:

1. A fluid treatment apparatus for treating a target fluid, comprising:
   a reactor having a cylindrical shape to decompose an organic substance contained in a mixed fluid of the target fluid with an oxidant by an oxidation reaction under heat and pressure, the reactor being placed such that a longitudinal direction of the cylindrical shape is set vertically, and having an introduction port on one end and a discharge port on the other end,
   one or more catalyst members each having a rod-like or plate-like shape extending in the longitudinal direction,
   wherein each of the one or more catalyst members is suspended in the reactor with an upper end surface thereof being fixed,
   wherein the upper end surface of each of the one or more catalyst members is located at a position which is not lower than an inflow position where the target fluid flows into the reactor through the introduction port or at a position which is lower than and in a vicinity of the inflow position, and
   wherein the introduction port has a double pipe structure comprising:
   a target fluid inflow pipe to introduce the target fluid; and
   an oxidant inflow pipe inserted into the target fluid inflow pipe, wherein an insertion length of the oxidant inflow pipe into the reactor is larger than an insertion length of the target fluid inflow pipe into the reactor.

2. The fluid treatment apparatus according to claim 1, wherein the upper end surface of at least one of the one or more catalyst members is located not lower than the inflow position.

3. The fluid treatment apparatus according to claim 1, wherein the upper end surface of at least one of the one or more catalyst members is not exposed to a space within the reactor.

4. The fluid treatment apparatus according to claim 1, wherein the one or more catalyst members comprise multiple catalyst members disposed at intervals in a circumferential direction of the cylindrical shape.

5. The fluid treatment apparatus according to claim 3,
   wherein the oxidant inflow pipe is inserted into the reactor in the longitudinal direction,
   wherein the one of more catalyst members have a rod-like shape and are connected to a lower end surface of the oxidant inflow pipe, and
   wherein a direction of discharge of the oxidant from the oxidant inflow pipe intersects the direction of flow of the target fluid.

6. The fluid treatment apparatus according to claim 5, further comprising:
   a plurality of plate-like catalyst members each having a flat-plate-like or corrugated-plate-like shape protruding from the one or more catalyst member having a rod-like shape in a radial direction of the cylindrical shape,
   wherein at least a part of an upper end surface of each plate-like catalyst member is located not lower than the inflow position.

7. The fluid treatment apparatus according to claim 5, wherein a position where the oxidant discharges and a position where the plate-like catalyst is protruding is displaced in a circumferential direction of the cylindrical shape.

8. The fluid treatment apparatus according to claim 1, further comprising:
   a second catalyst member disposed along an inner periphery of the reactor surrounding the one or more catalyst members.

9. The fluid treatment apparatus according to claim 8,
   wherein the second catalyst member has a cylindrical shape,
   wherein the reactor has protruding portions on an inner periphery thereof, and
   wherein a lower end surface, in the direction of flow of the target fluid, of the second catalyst member is placed on the protruding portions.

* * * * *